United States Patent [19]

Dugdale

[11] Patent Number: 5,525,272
[45] Date of Patent: Jun. 11, 1996

[54] METHOD OF BACKSCREEN FABRICATION USING PRE-COATED MATERIAL

[75] Inventor: Jonathan L. Dugdale, Burleson, Tex.

[73] Assignee: Hughes Traninig Inc., Los Angeles, Calif.

[21] Appl. No.: 317,104

[22] Filed: Oct. 3, 1994

Related U.S. Application Data

[63] Continuation of Ser. No. 10,227, Jan. 28, 1993, abandoned.

[51] Int. Cl.$^6$ ............................. B29C 51/14; B29D 11/00
[52] U.S. Cl. ........................ 264/1.34; 264/1.7; 264/129; 264/134; 264/322
[58] Field of Search .............................. 264/129, 134, 264/291, 316, 319, 292, 322, 166.5, 1.7, 1.1, 1.34, 1.32

[56] References Cited

U.S. PATENT DOCUMENTS

| | | | |
|---|---|---|---|
| 2,406,843 | 9/1946 | Luth et al. | 264/316 |
| 2,408,540 | 10/1946 | Williams | 264/1.7 |
| 2,481,809 | 9/1949 | Barnes | 264/134 |
| 2,562,078 | 7/1951 | Winnek | 264/134 |
| 2,640,227 | 6/1953 | Johnson | 264/1.7 |
| 2,700,007 | 1/1955 | Dennison et al. | 264/291 |
| 2,848,753 | 8/1958 | Anspon et al. | 264/316 |
| 3,372,971 | 3/1968 | Quackenbush et al. | 359/451 |
| 3,562,983 | 2/1971 | Ayres | 264/291 |
| 3,655,472 | 4/1972 | Chandler | 156/156 |
| 3,846,161 | 11/1974 | Marks | 264/319 |
| 4,089,587 | 5/1978 | Schudel | 359/451 |
| 4,228,267 | 10/1980 | Higashizume et al. | 264/291 |
| 4,293,603 | 10/1981 | Hayman-Chaffey et al. | 264/129 |
| 4,339,400 | 7/1982 | Solko-Ram | 264/134 |
| 4,798,690 | 1/1989 | Levy | 264/1.7 |
| 4,976,896 | 12/1990 | Short et al. | 264/134 |
| 4,986,950 | 1/1991 | Long | 264/665 DE |

FOREIGN PATENT DOCUMENTS

| | | |
|---|---|---|
| 1572828 | 7/1968 | France . |
| 2253228 | 11/1974 | France . |
| 2384604 | 3/1978 | France . |
| 1602881 | 11/1981 | United Kingdom . |

*Primary Examiner*—Jay H. Woo
*Assistant Examiner*—Duane S. Smith
*Attorney, Agent, or Firm*—Jeannette M. Walder; Wanda K. Denson-Low

[57] ABSTRACT

The method for the fabrication of a curved back projection screen includes coating the screen before forming a sheet into the proper curvature. In one embodiment the sheet includes lenticulations to improve the perceived luminous intensity thereof. Through this method a back projection screen is provided that overcomes the manufacturing difficulties associated with previously known methods.

16 Claims, 5 Drawing Sheets

METHOD OF BACKSCREEN FABRICATION USING PRE-COATED MATERIAL

This is a continuation application Ser. No. 08/010,227 filed Jan. 28, 1993, now abandoned.

FIELD OF THE INVENTION

This invention is directed toward a method for the fabrication of back projection screens. More particularly, the invention is directed toward the fabrication of such projection screens using a pre-coated material.

BACKGROUND OF THE INVENTION

Back projection screens have become increasingly popular. These screens produce images when interposed between the viewer and the projection device. Back projection screens are usually made from a clear acrylic sheet which is coated with a diffusion coating which is usually translucent. The image to be displayed is projected onto the thermoplastic diffusion coating by a projector or the like. The translucent diffusion coating then transmits the image through the clear acrylic sheet where it is viewed by the viewer.

Typically, curved back projection screens have been fabricated by forming the acrylic sheet to the proper curvature, for example through blow molding techniques, and then applying the coating material to the formed acrylic sheet. Hence, in the prior art, the coating material must be applied either by use of spraying techniques or by bonding the coating to the sheet after the sheet has been formed to the proper curvature.

Further, in the prior art, imperfections often occur during the application of the thermoplastic coating to the curved surface of the sheet. These imperfections often result in a complete loss or expensive rework of the entire part. When the applied coating is substandard the part is usually solvent-stripped and then recoated. The stripping of the coating from the acrylic sheet may result in the loss of the entire part as a result of solvent's effect on the quality of the acrylic sheet.

SUMMARY OF THE INVENTION

Accordingly, this invention is directed toward a method for fabricating a back projection screen which uses a pre-coated acrylic sheet. Pre-coating the acrylic sheet allows the user of the invention to ensure that the coating meets the required specifications prior to forming. The method allows forming of the part without the possibility of marring the coating. The coating is not marred since the screen is formed on a tool having a convex curvature and only the concave uncoated surface of the screen is in contact with the forming tool.

The method comprises applying a coating to a plastic sheet, the sheet having first and second planar surfaces, a boundary and a specified thickness. The coating is applied to the first surface. The second surface of the coated sheet is then placed in contact with a forming tool having a curvature. The coated sheet is then shaped.

The use of the tool's convex curvature allows subsequent thermoforming of the screen without having the coating contact the forming tool.

DETAILED DESCRIPTION

The present invention relates to an improvement in the method of manufacturing back projection screens. The following description is presented to enable one of ordinary skill in the art to make and use the invention as provided in the context of a particular application and its requirements. Various modifications to the preferred embodiment will be readily apparent to those skilled in the art, and the generic principles defined herein may be applied to other embodiments. Thus, the present invention is not intended to be limited to the embodiment shown, but is to be accorded the widest scope consistent with the principles and novel features disclosed herein.

Figure 1:
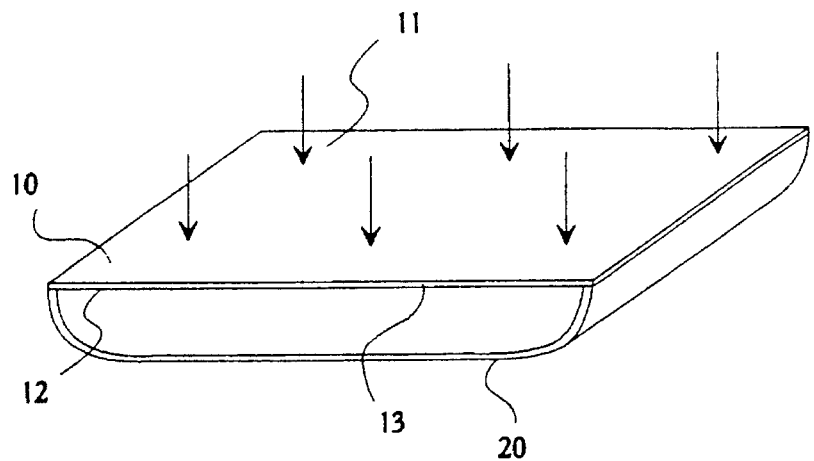
FIG. 1 shows a method of manufacturing a back projection screen in accordance with the prior art.
Figure 1:
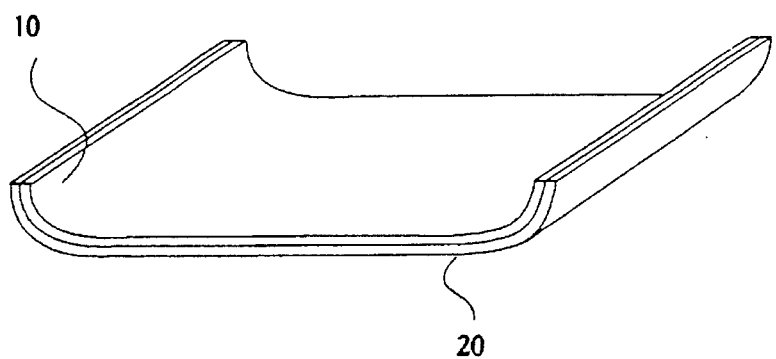
Figure 1:
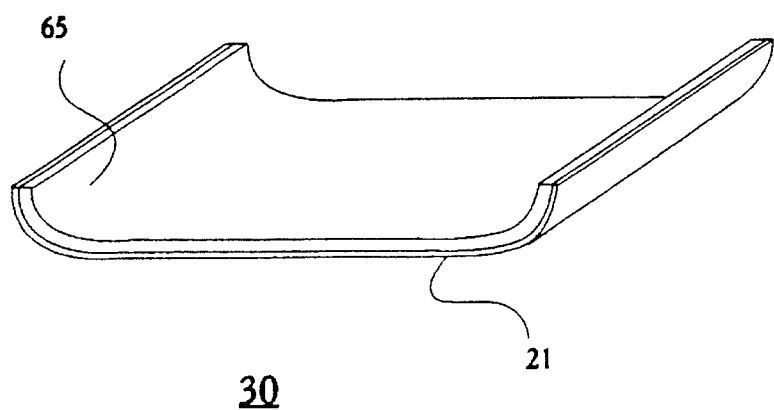

FIG. 1 illustrates a method of back projection screen fabrication in accordance with the prior art. In the prior art, a clear acrylic sheet 10 is formed to conform to the curvature of the forming tool 20. The sheet 10 has a first surface 11, a second surface 12 and a specified thickness 13. In this embodiment, the curvature of the forming tool 20 is concave since the sheet 10, when placed upon the tool 20, includes the center of curvature of the tool 20. In the forming step of this embodiment, the second surface 12 of the sheet 10 is in contact with the forming tool 20. The resulting sheet 65 is then coated either by spraying the coating material 21 onto the second surface 12 or by thermoforming the coating and bonding the thermoformed coating to the sheet 65. The resulting part is the coated acrylic sheet 30.

Typically, the prior art method requires the application of the coating after forming the acrylic sheet 10. This is necessary since pre-coating the second surface 12 of the sheet 10 may result in marring or cracking of the coating when the second surface 12 is placed in contact with the forming tool 20 during the forming step of the method.

Another disadvantage of the above-described prior art method is that the part may be irreparably damaged during the fabrication process. It is known that nonuniformity in the coating or other flaws will result in degradation in the performance of the finished screen. Attempts to save a part with a flawed coating involve the use of solvents or the like. Materials such as solvents are used to strip the flawed coating from the acrylic sheet 30. The process of stripping and re-coating may result in the loss of the entire part 30 due to the imperfections in the acrylic sheet 65 which may be caused by stripping the part 30.

The present invention is directed toward a method that overcomes the problems associated with the above-described prior art method. To more fully understand the present invention refer now to FIGS. 2 and 3 which show in a block diagram the method for forming a back projection screen in accordance with the present invention.

Figure 2:
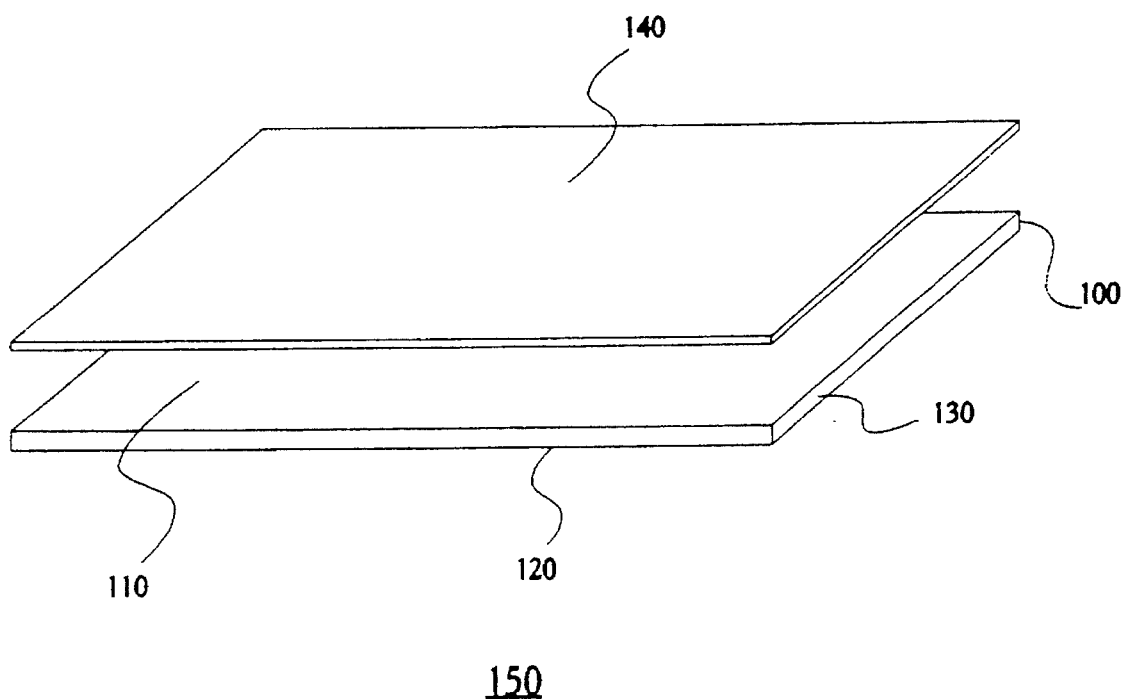
FIG. 2 shows a plastic sheet and its associated coating in accordance with the present invention.

Referring now to FIG. 2, the first embodiment of the present invention comprises an acrylic sheet 100, the sheet having a first surface 110, a second surface 120 and a specified thickness 130. Typically, the acrylic sheet 100 is clear. A diffusion coating 140 is then applied to the first surface 110 of the acrylic 100. The coating may be applied by painting, bonding or the like such that the coating 140 is firmly secured to the sheet 100. Typically, the specially designed coating 140 is translucent such that the resulting coated sheet 150 has a reflective gain to match the desired specification.

Figure 3:
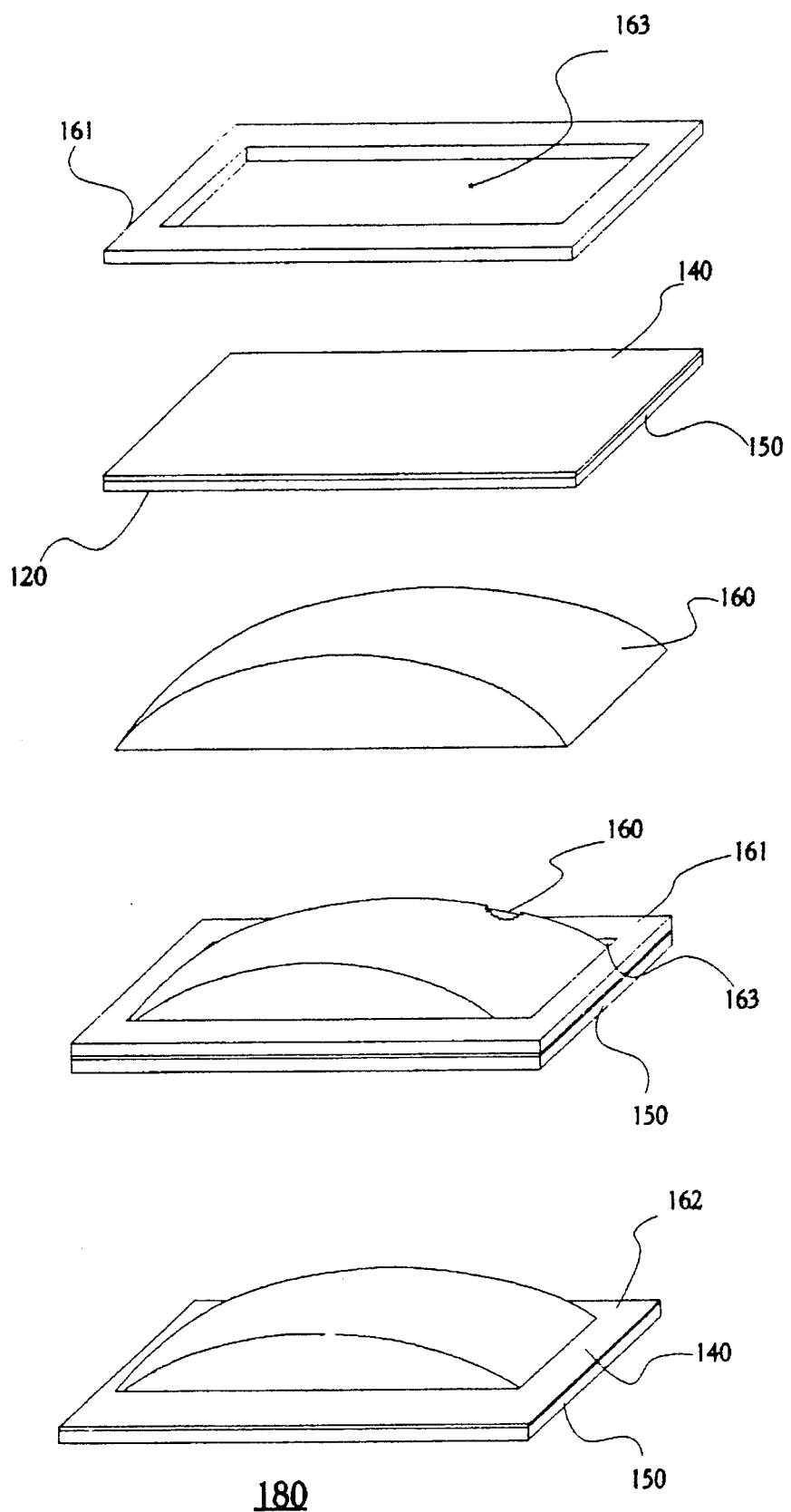
FIG. 3 shows a first embodiment of the method of manufacturing a back projection screen with the coated sheet in FIG. 2.

Referring now to FIG. 3, subsequent to applying the coating 140 to the acrylic sheet 100, the coated sheet 150 is shaped to conform to the curvature of the forming tool 160. The coated sheet 150 is shaped using techniques such as stretch forming with the uncoated second surface 120 of the coated sheet 150 in contact with the forming tool 160. It is known that the stretch molding process may include preheating the sheet 150 prior to forming the part. The forming step requires the application of heat and pressure to the sheet 150. Control of these process parameters is important to ensure that the coated sheet is not marred and does not develop cracks during the forming step.

As mentioned above, forming of the coated sheet 150 takes place with the second surface 120 in contact with the forming tool 160. In this embodiment, the tool 160 has a single convex curvature where the sheet 150, once placed in contact with the tool 160, does not contain the center of curvature of the tool 160. Also, it should be noted that forming the sheet 150 to the curvature of the tool involves the use of a framing means 161 to clamp the periphery 162 of the sheet 150. The framing means 161 as shown includes an opening 163 therewithin.

Pressure exerted on the sheet 150 by the framing means 161 causes the screen to be formed in a concave shape. The framing means 161 is such that it comes into contact with the periphery 162 but due to opening 163, the framing means 161 does not come into contact of the coated surface 140 of the coated sheet 150 and there is no marring or cracking of the coating 140 within the effective display area of the screen. The resulting part is the formed and coated acrylic sheet 180. The periphery 162 that was formerly clamped may then be trimmed away.

The first embodiment of the present invention has several advantages over the prior art. First, the coating 140 is applied prior to forming the part to conform to the tool's 160 curvature. The back projection screen is then formed without the coated side 140 of the sheet 150 coming into contact with the forming tool 160. Thus, there is no possibility the coating 140 will be abraded by the forming tool 160.

Figure 4:
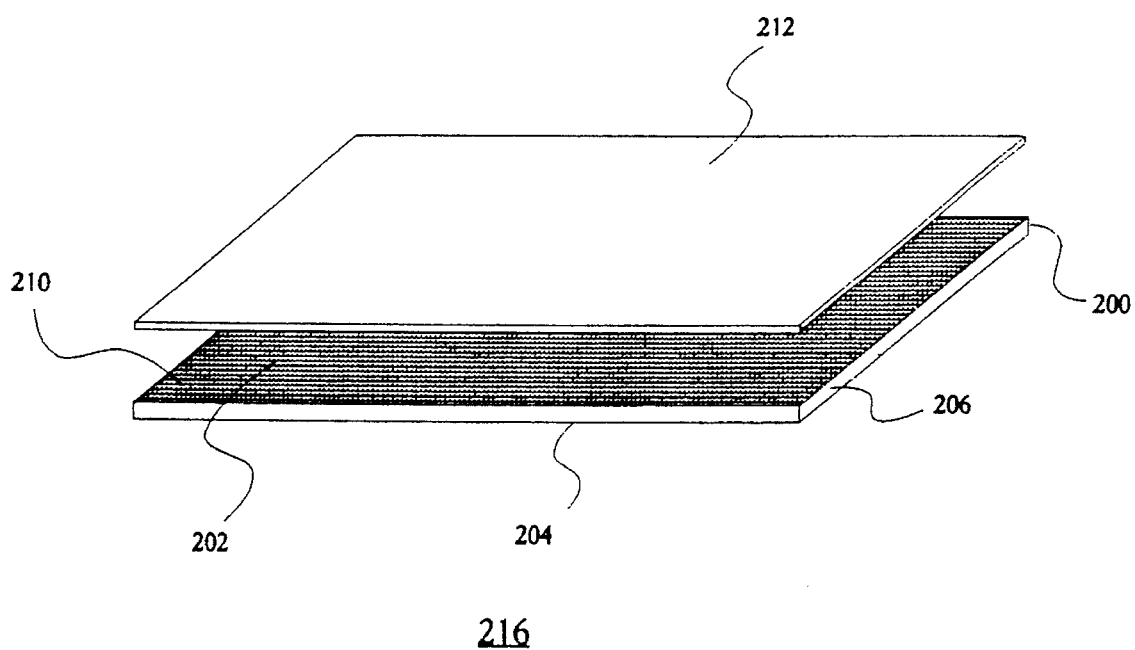
FIG. 4 shows a plastic sheet which includes lenticulations and its associated coating in accordance with the present invention.
Figure 5:
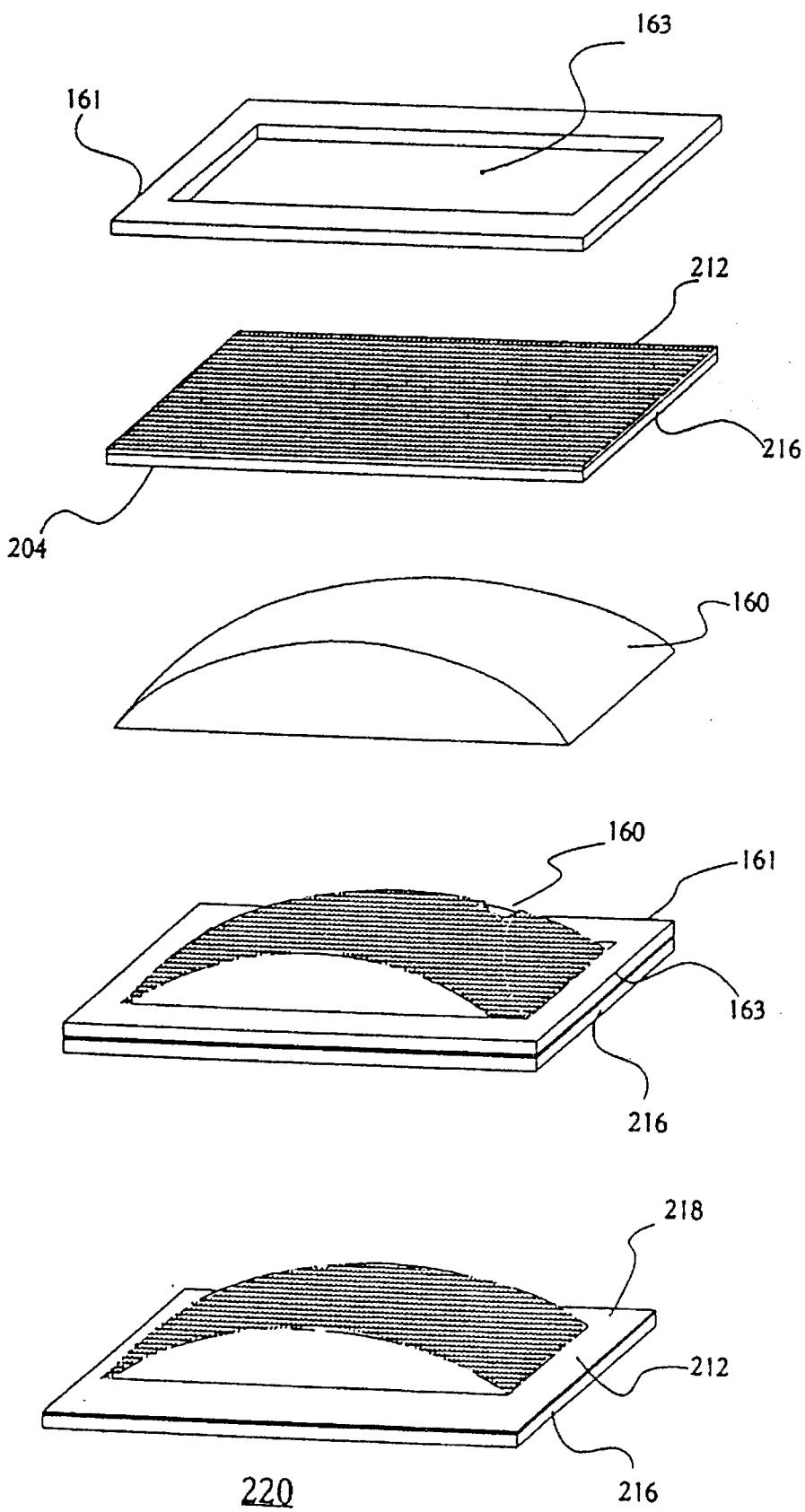
FIG. 5 shows a second embodiment of the method of manufacturing a back projection screen in accordance with the present invention with the coated sheet of FIG. 4.

FIGS. 4 and 5 show a second embodiment of the present invention. Referring now to FIG. 4, in this embodiment acrylic sheet 200 has a first planar surface 202, a second planar surface 204, and a specified thickness 206. Lenticulations 210, having the property of increasing the amount of light focussed by the screen, are formed or machined on the first planar surface 202 of the acrylic sheet 200. In this embodiment, the acrylic sheet 200 is clear. A translucent diffusion coating 212 having a gain is then bonded to the first surface 202 on top of the lenticulations 210 of the acrylic sheet 200. The coating 212 may be painted, bonded or the like in the same manner as in the method described above in conjunction with FIG. 2. The result is the coated, lenticulated acrylic sheet 216.

Referring now to FIG. 5, similar to the previously described first embodiment of FIG. 3, subsequent to applying the coating 212 to the lenticulation-bearing acrylic sheet 200, coated sheet 216 is shaped under heat and pressure to conform to the curvature of the forming tool 160. Control of the heat and pressure applied in forming the coated sheet 216 is important to ensure that the coating 212 is not marred and does not develop cracks during the forming step. Additionally, in this embodiment it is important that these process parameters be controlled such that the lenticulations 210 maintain their integrity during the forming step of the process.

Again, similar to that described in the first embodiment of the present invention, techniques such as stretch forming may be used to shape the coated sheet 216. In the stretch molding process it is possible that the coated 216 may be preheated prior to forming the part. The coated sheet 216 is shaped with the second surface 204 of the coated sheet 216 in contact with the forming tool 160. In this embodiment, as above, the forming tool 160 has a convex curvature. Thus, the lenticulation-bearing first surface 202 (noted in FIG. 4) of the coated sheet 216 does not come into contact with the forming tool 160. As is the case in the first embodiment discussed above, forming of the coated sheet 216 requires the use of the framing means 161. The framing means 161 as shown includes an opening 163 therewithin. The framing means 161 will come into contact with the periphery of the coated sheet 216.

As described before in conjunction with the first embodiment of the present invention, the periphery is narrow enough with a center opening 163 that contact with the framing means 161 will not result in marring of the coating within the effective display area of the finished screen. Thereafter the periphery 218 of the resultant sheet 220 can be trimmed away.

It is further an advantage of the present invention over the prior art that the lenticulations themselves will not come into contact with the forming tool 160. Just as it is important not to mar the coating, this method ensures that lenticulations 210 are not marred. The possibility of damage to the lenticulations 210 arises in this case since the lenticulation-bearing first surface 202 of the coated sheet 216 would necessarily come into contact with the forming tool 160 if prior art methods were utilized.

Therefore, the present invention provides a further improvement in the manufacture of back-projection screens.

It is understood the above-described embodiments are merely illustrative of the possible specific embodiments which can represent applications of the principle of the present invention. Other arrangements may be readily devised in accordance with those principles by one of the ordinary skill in the art without departing from the spirit and scope of the present invention. The scope of the invention is limited only by the following claims.

What is claimed is:

1. A method for manufacturing a curved back projection screen including a transparent polymeric sheet having a boundary, a specified thickness, a first surface and a second surface, and a translucent optical diffusion coating having a predetermined optical gain on the first surface, the method comprising the steps of:

(a) with the transparent sheet in a substantially planar state, applying the translucent optical diffusion coating on the first surface of the sheet;

(b) placing the transparent polymeric sheet having the optical diffusion coating already formed on the first side thereof on a forming means having a compound curvature, with only the second planar surface of the coated sheet being in contact with the forming means; and (c) shaping the placed coated sheet to conform to said curvature without the coating coming into contact with any surface of any forming means.

2. The method according to claim 1 wherein the polymeric sheet is a clear acrylic sheet.

3. The method according to claim 2 wherein the optical diffusion coating is a translucent thermoplastic coating.

4. The method according to claim 3, wherein the coating is bonded on the first surface.

5. The method according to claim 3, wherein the coating is sprayed on the first surface.

6. A method for manufacturing a curved back projection screen including a clear acrylic sheet having a boundary, a specified thickness, a first planar surface, a second planar surface, and an optical diffusion coating having a predetermined optical gain on the first surface, the method comprising:

(a) applying a translucent thermoplastic optical diffusion coating having a predetermined optical gain on the first surface of the clear acrylic sheet while the sheet is in a planar state;

(b) clamping the coated sheet into a framing means;

(c) preheating the clamped coated acrylic sheet and the framing means to a specified temperature;

(d) placing the preheated coated acrylic sheet on a forming means having at least a first convex curvature, with only the second surface of the clear acrylic sheet being in contact with the forming means; and (e) forming the preheated coated acrylic sheet by exerting pressure on the framing means causing the preheated coated acrylic sheet to permanently conform to the forming means without the coating coming into contact with any surface of any forming means.

7. A method for manufacturing a back projection screen including a transparent polymeric sheet having a specified thickness, a boundary, a first planar surface, and a second planar surface, having lenticulations on the first surface, and having an optical diffusion coating with a predetermined optical gain on top of the lenticulations, the method comprising the steps of:

(a) applying an optical diffusion coating having a predetermined optical gain to the lenticulation-bearing first surface of the transparent sheet while the sheet is in a planar state;

(b) placing the coated sheet on a forming means having a compound curvature, with only the second surface of the coated sheet being in contact with the forming means; and (c) shaping the placed sheet to permanently conform to said curvature without the coating coming into contact with any surface of any forming means.

8. The method according to claim 7, wherein the polymeric sheet comprises a clear acrylic sheet.

9. The method according to claim 8, wherein the coating is a translucent thermoplastic coating.

10. The method according to claim 9, wherein step (b) comprises bonding.

11. The method according to claim 9, wherein step (b) comprises spraying.

12. A method for manufacturing a curved back projection screen including a clear acrylic sheet having a boundary, a specified thickness, a first planar surface and a second planar surface, having lenticulations on the first surface and having an optical diffusion coating with a predetermined optical gain on top of the first surface, the method comprising the steps of:

(a) with the acrylic sheet in a substantially planar state, bonding a translucent thermoplastic optical diffusion coating having a predetermined optical gain on the lenticulations of the first surface of the clear acrylic sheet;

(b) clamping the coated lenticulated sheet into a framing means;

(c) preheating the clamped acrylic sheet and the framing means to a specified temperature;

(d) placing the preheated coated, lenticulation-bearing sheet on a forming means having at least a first convex curvature, with only the second surface of the acrylic sheet being in contact with the forming means; and (e) forming the preheated acrylic sheet by exerting pressure on the framing means causing the preheated coated lenticulated acrylic sheet to permanently conform to the forming means without the coating or lenticulations coming into contact with any surface of any forming means.

13. The method of claim 1 wherein said compound curvature of said forming means defines a center of curvature, and said sheet when said second surface is placed in contact with said forming means does not contain said center of curvature.

14. The method of claim 1 wherein said convex curvature of said forming means defines a center of curvature, and said sheet when said second surface is placed in contact with said forming means does not contain said center of curvature.

15. The method of claim 7 wherein said compound curvature of said forming means defines a center of curvature, and said sheet when said second surface is placed in contact with said forming means does not contain said center of curvature.

16. The method of claim 12 wherein said convex curvature of said forming means defines a center of curvature, and said sheet when said second surface is placed in contact with said forming means does not contain said center of curvature.

* * * * *